Nov. 26, 1957 D. N. HURWITZ 2,814,115

COMPUTER

Filed March 29, 1954 6 Sheets-Sheet 1

INVENTOR
DAN N. HURWITZ
BY Dike, Thompson & Sanborn
ATT'YS.

INVENTOR
DAN N. HURWITZ
BY Dike, Thompson & Sexton
ATT'YS

Nov. 26, 1957 D. N. HURWITZ 2,814,115

COMPUTER

Filed March 29, 1954 6 Sheets-Sheet 3

INVENTOR
DAN N. HURWITZ
BY Dike, Thompson & Sanborn
ATT'YS.

Nov. 26, 1957 D. N. HURWITZ 2,814,115

COMPUTER

Filed March 29, 1954 6 Sheets-Sheet 4

INVENTOR
DAN N. HURWITZ
BY Dike, Thompson & Sanborn
ATT'YS.

INVENTOR
DAN N. HURWITZ
BY Dike, Thompson & Sanborn
ATT'YS.

Nov. 26, 1957 D. N. HURWITZ 2,814,115

COMPUTER

Filed March 29, 1954 6 Sheets-Sheet 6

INVENTOR
DAN N. HURWITZ
BY Dike, Thompson & Sanborn
ATT'YS.

United States Patent Office 2,814,115

Patented Nov. 26, 1957

2,814,115

COMPUTER

Dan N. Hurwitz, St. Louis, Mo.

Application March 29, 1954, Serial No. 419,279

19 Claims. (Cl. 33—1)

Figure 3:
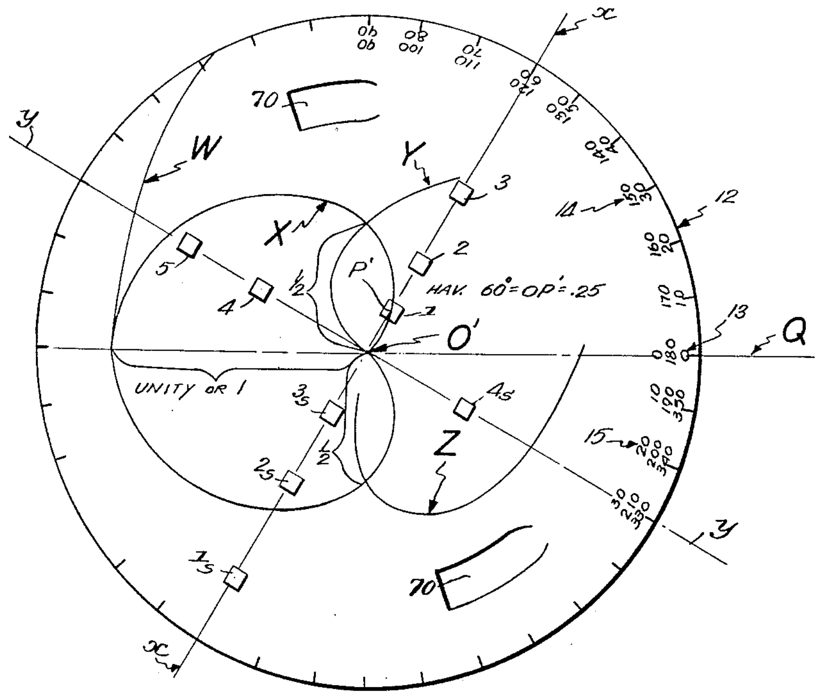

This invention relates to a mechanical computer for use in solving equations containing functions of angular variables and particularly applicable to the solution of spherical and plane triangles in the practice of celestial navigation and surveying.

In solution of spherical triangles, if the values of the three sides are known, the unknown value of an included angle may be found; and if the values of two sides and an included angle are known, the unknown value of the third side may be found. Thus, the navigator may solve for his co-latitude and latitude from known and observed values of co-declination, local hour angle and co-altitude of the observed celestial body. Likewise, he may solve for azimuth of the observed body from its co-altitude, co-latitude and co-declination. Similarly, he may solve for co-altitude from co-latitude, co-declination and local hour angle.

In triangulation and plane surveying, one of the sides of a plane oblique triangle may be calculated from two known interior angles and one known side.

Such triangular solutions have long been obtainable in various ways, both mathematical and graphic, but these methods are tedious and subject to error.

The present invention provides a mechanism and method for automatically and accurately providing these solutions of plane and spherical triangles and will be particularly described and illustrated as applicable thereto. The computer is also adaptable to other types of solutions involving equations of functions of angular variables as will be further described.

Figure 1:
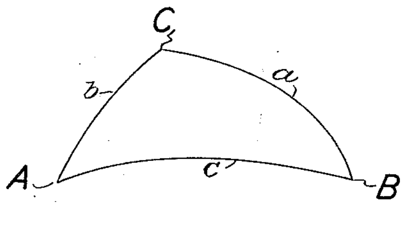
Figure 2:
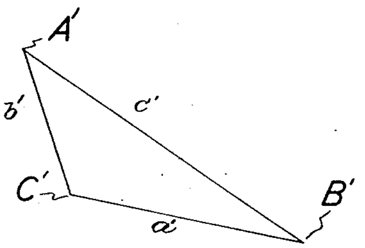
Figure 4:
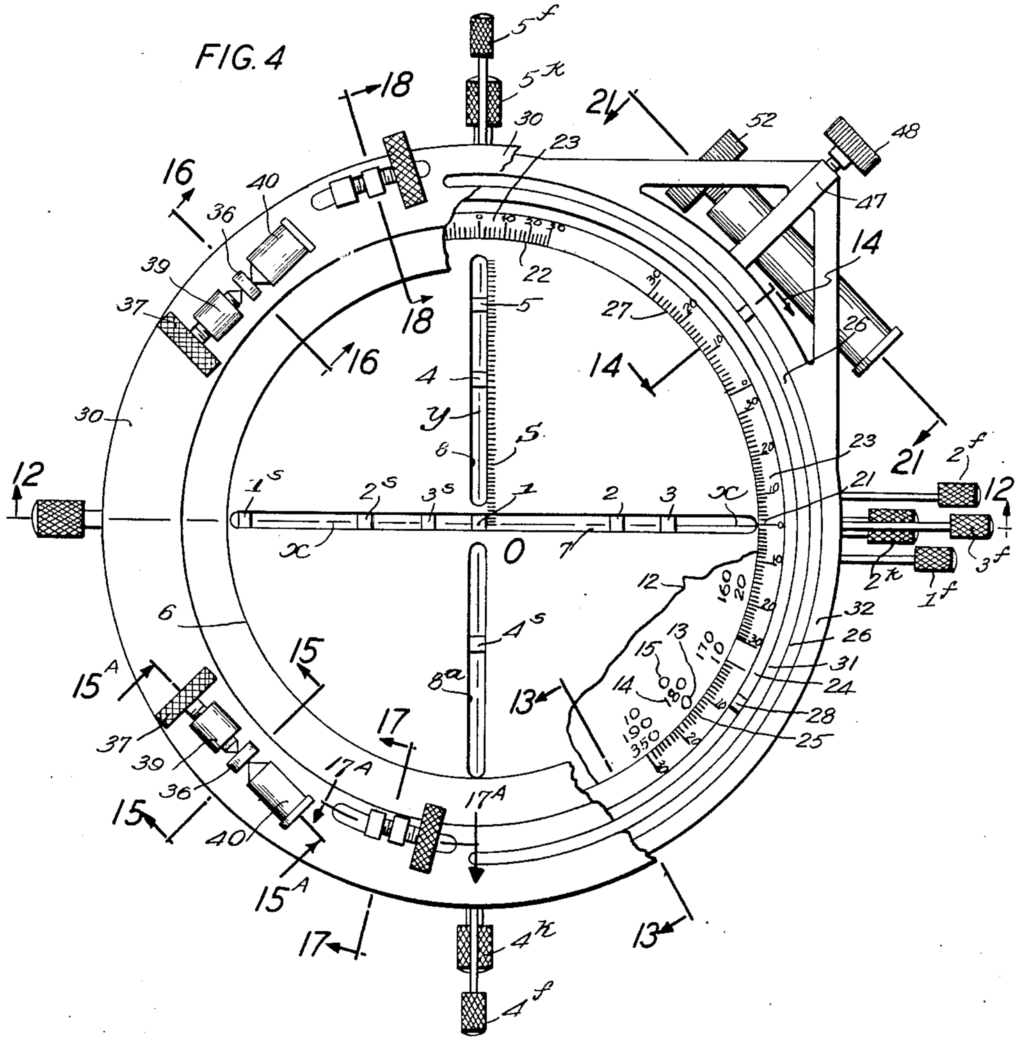
Figure 5:
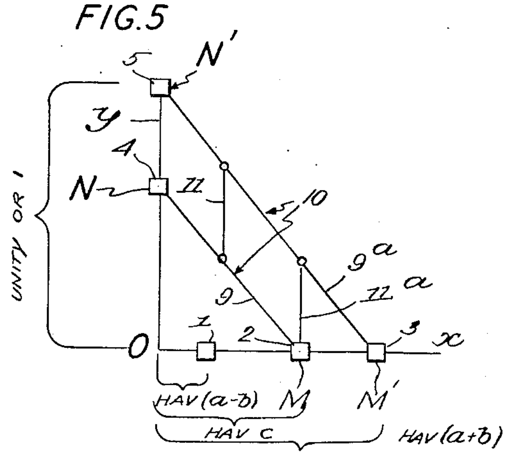
Figure 6:
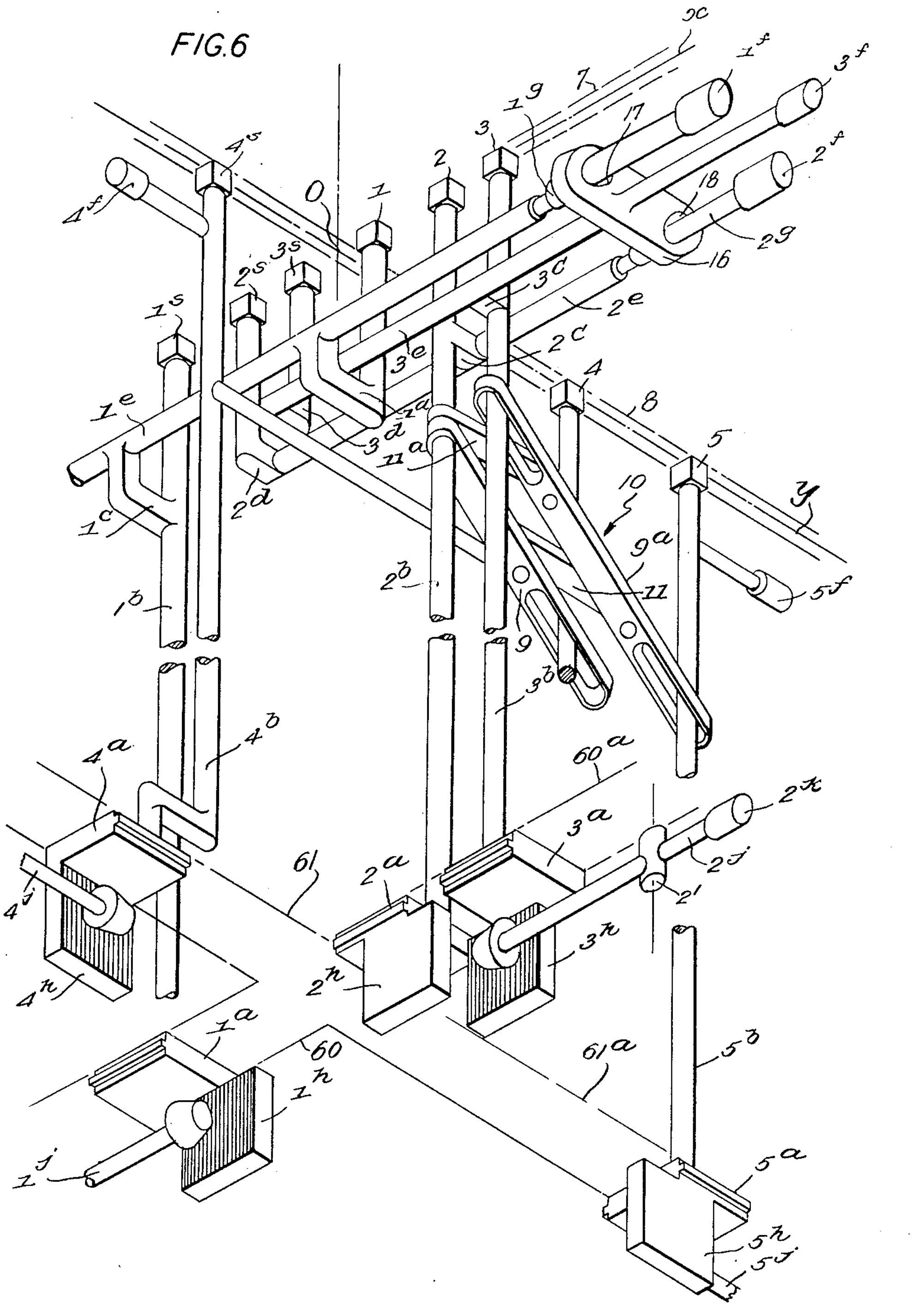
Figure 12:
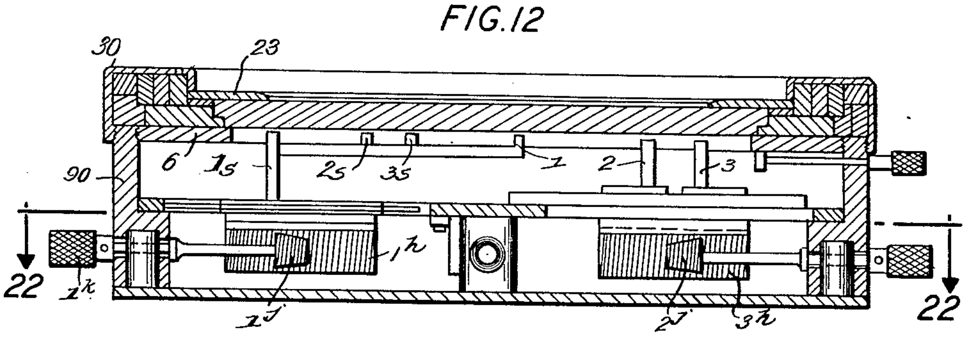
Figures 13, 14, 15, 15A, 16, 17, 17A, 18:
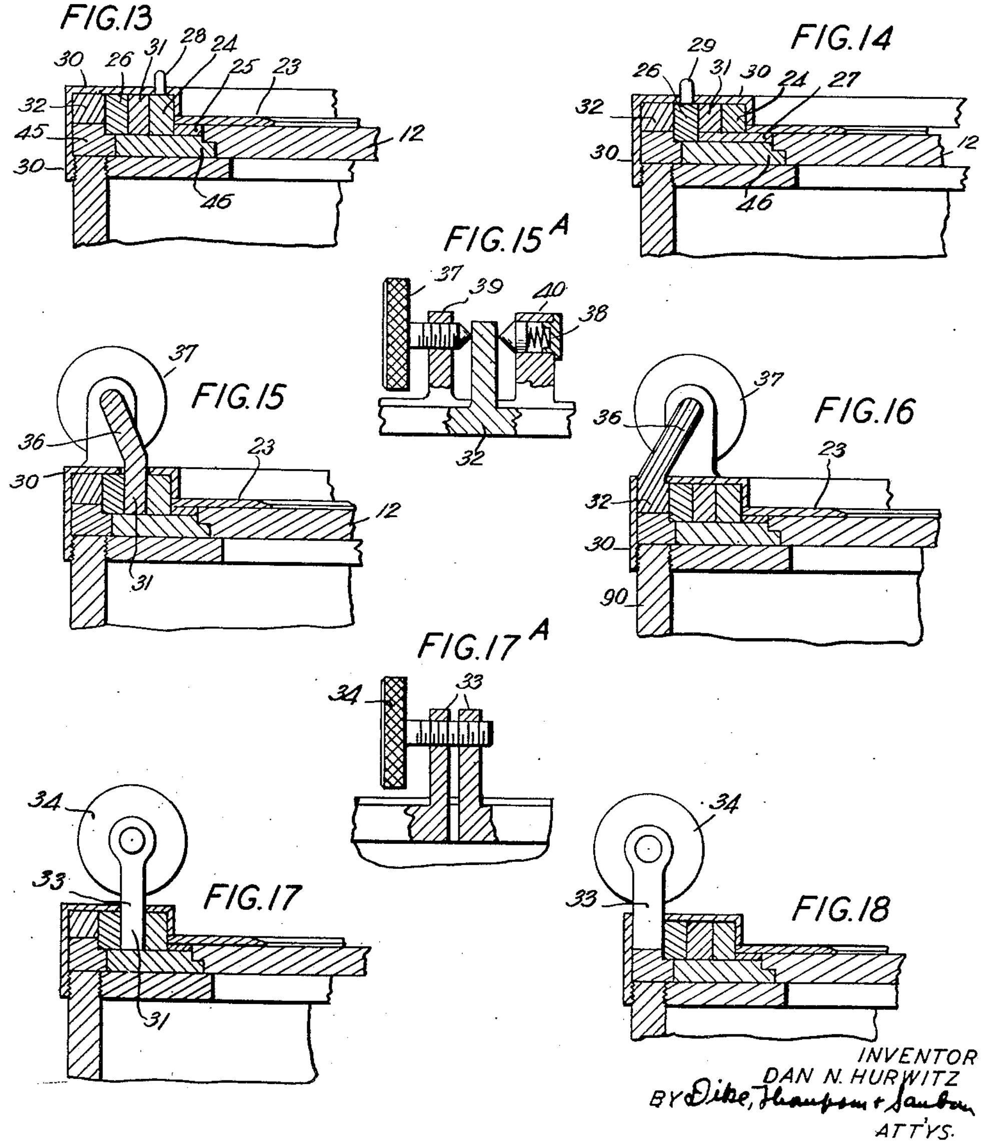
Figure 19:
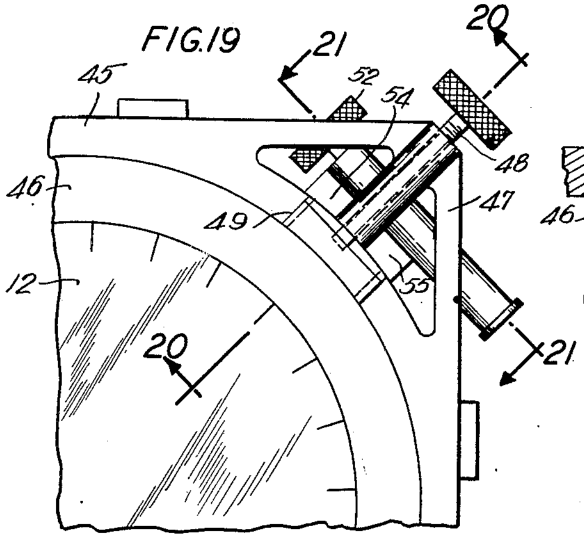
Figure 20:
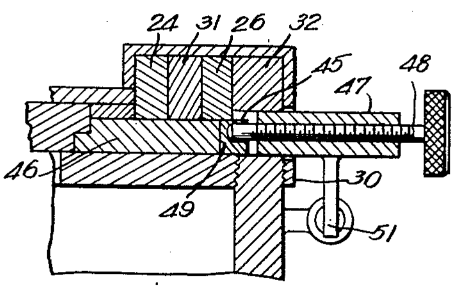
Figure 21:
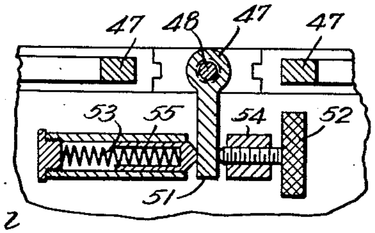
Figure 22:
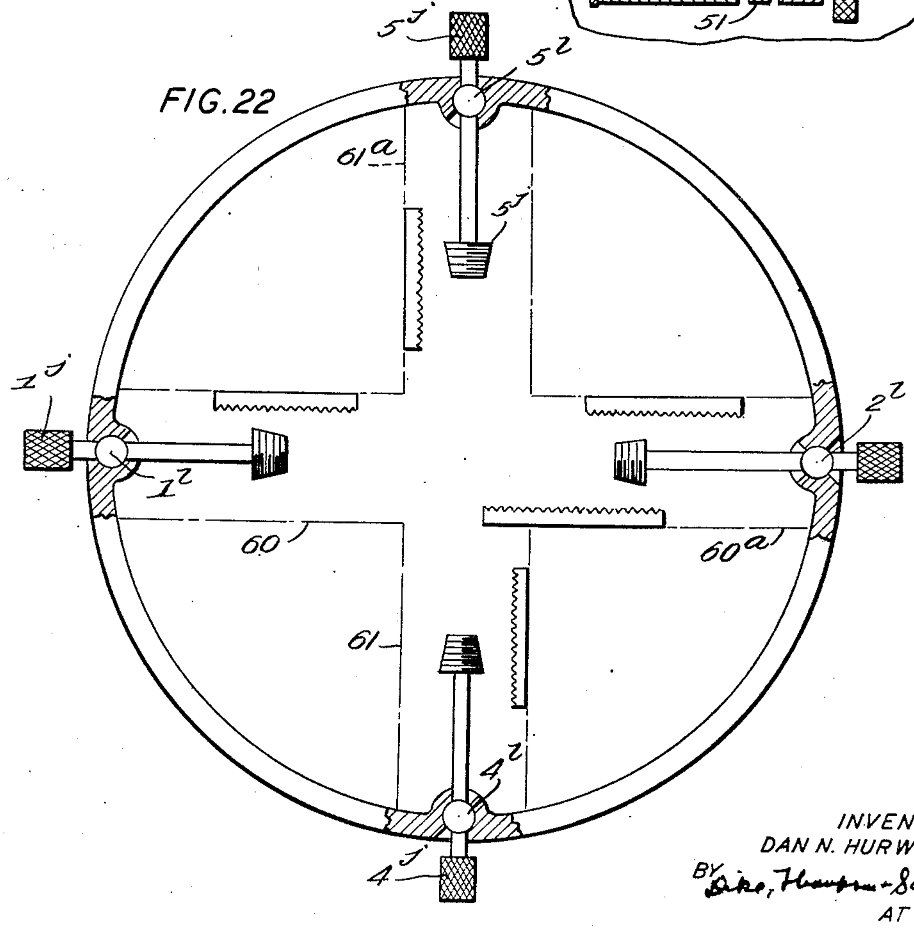

In the drawings:

Fig. 1 is a perspective view of the spherical triangle, solution of which by the computer of the invention is described, Fig. 2 is a view of the plane triangle, solution of which by the computer is described, Fig. 3 is a top plan view of the circle plate used for solution of spherical and plane triangles, superimposed upon the rectangular coordinates and their indicators, Fig. 4 is a top plan view of the computer with the circle plate removed except for a fragment thereof, Fig. 5 is a schematic top plan view of the principal indicators on the rectangular coordinate and the parallelogram mechanism connecting four of them, Fig. 6 is a perspective view of the indicators and their operating mechanisms, somewhat distorted in a vertical direction for clarity, Figs. 7–11 are views similar to Fig. 5 with the indicators in various positions during the solutions of the spherical and plane triangles, Fig. 12 is a side or edge view of the computer partly in cross section taken along the lines 12—12 of Fig. 4, Fig. 13 is an enlarged fragmentary section taken along the lines 13—13 of Fig. 4, Fig. 14 is an enlarged fragmentary section along the lines 14—14 of Fig. 4, Fig. 15 is an enlarged fragmentary section taken on the lines 15—15 of Fig. 4, Fig. 15*a* is an enlarged fragmentary section taken on the lines **15*a*—15*a* of Fig. 4, Fig. 16 is an enlarged fragmentary section taken on the lines 16—16 of Fig. 4, Fig. 17 is an enlarged fragmentary section taken on the lines 17—17** of Fig. 4, Fig. 17*a* is an enlarged fragmentary section taken on the lines **17*a*—17*a* of Fig. 4, Fig. 18 is an enlarged fragmentary section taken on the lines 18—18 of Fig. 4, Fig. 19 is an enlarged fragmentary top plan view of the instrument, Fig. 20 is an enlarged fragmentary section taken on the lines 20—20 of Fig. 19, Fig. 21 is an enlarged fragmentary section taken on the lines 21—21 of Fig. 19, and Fig. 22 is a top plan view, taken partly in sections, on the lines 22—22** of Fig. 12.

The principal elements of the computer comprise a rotatable transparent circle plate 12, Figs. 3 and 12, having a center or origin O′, and underneath it, a fixed slide plate 6, Figs. 4 and 12, having an axial slideway 7 and at right angles to it a pair of transverse slideways 8, **8*a***, forming respectively a pair of rectangular coordinates *x* and *y* having an origin O coinciding with the origin O′ of the circle plate 12. These and other parts to be described are supported within a circular bowl or housing 90, Fig. 12.

Slidable together in the slide plate 6 along the axis *x* are a pair of indicators 1 and **1*s*** which are spaced from each other at a fixed distance of 1 or unity on the scale of the instrument. Also, fixed spaced from each other at unity and slidable together on the axis *x* are two other pairs of indicators 2, **2*s* and 3, 3*s*. A fourth pair of indicators 4 and 4*s*** spaced at unity are slidable together on the axis *y*, and a single indicator 5 also slides on the axis *y*.

Now referring to Figs. 5 and 6, the indicators 2, 3, 4 and 5 are connected together by a parallelogram mechanism indicated at 10, shown schematically in Fig. 5 and in detail in Fig. 6, the latter figure being somewhat distorted for purposes of clarity. This mechanism consists of parallel links 9 and **9*a* and cross links 11 and 11*a* arranged pivotally and slidably so that the links 9 and 9*a* may be moved apart or together by sliding either of the indicators 2 or 3** along the axis *x* or by sliding either of the indicators 4 or 5 along the axis *y*, while keeping the links 9 and **9*a* parallel. Also seen in Fig. 6 are the fixed connections which hold the pairs of indicators 1, 1*s*, 2, 2*s* and 3, 3*s* in spaced relation. The pairs of indicators 1, 1*s*, 2, 2*s*, and 3, 3*s* may be moved independently of each other. Further shown in Fig. 6 are means indicated at 16 by which either or both of the pairs of indicators 1, 1*s*, and 2, 2*s* may be locked to the indicators 3, 3*s*** and moved simultaneously therewith in fixed spaced relation along the axis *x*. Means to be described are also provided for locking any of the indicators in position along their respective axes *x* and *y*.

Referring particularly to Fig. 5, it is apparent that the indicators 2 and 4, together with the origin O form a right triangle OMN which, in any allowable position of the indicators, is always similar to a right triangle OM′N′ formed by the origin O and the indicators 3 and 5, and that the parts of these two triangles bear the relationship $$\frac{OM}{OM'}=\frac{ON}{ON'}$$

It is further seen that if the value of ON' be taken as unity or 1, then $$\frac{OM}{OM'}=ON$$

Fig. 3 shows the variable rotatable relationship between the circle plate 12 and the axes *x* and *y*. The circle plate 12 has an outer scale 13 graduated in degrees of arc from 0° to 360° counterclockwise from a polar axis Q, thus forming with the origin O a set of polar coordinates. It also has a middle scale 14 running clockwise from the reciprocal end of the axis Q and an inner scale 15 running clockwise from the axis Q from 0° to 180°.

A cardioid curve X is inscribed on the circle plate 12 with reference to the polar coordinates describing the locus of points which satisfy the equation $$P_1=\frac{1-\cos\theta}{2}$$

The point $P_1$ on the radial ordinate of any angle $\theta$ measures radially from the origin O' a linear value which satisfies $P_1$ in the equation. These values run from 0 to 1 for angles $\theta$ from 0° to 180°, and from 1 to 0 for angles $\theta$ from 180° to 360°. For instance, by inspection of Fig. 3 it will be seen that the value of $P_1$ for an angle of 0° is zero and the point $P_1$ on the curve X is therefore at the origin O'. When the angle $\theta$ is 90° or 270°, the value of $P_1$ as established by the curve X is ½ and, when the angle $\theta$ equals 180°, the value of $P_1$ is unity or 1. The scale of the curve X is established by convenience.

Mathematically, the spherical triangle, ABC, Fig. 1, may be solved by the haversine formula $$\text{hav } C=\frac{\text{hav } c-\text{hav } (a-b)}{\text{hav } (a+b)-\text{hav } (a-b)}$$

Since by definition $$\text{hav } \theta=\frac{1-\cos\theta}{2}$$

it is seen that $P_1=\text{hav } \theta$ on the curve X in Fig. 3 and that it is a curve of the haversines of angles $\theta$ from 0° to 360° on the polar coordinates of the circle plate 12.

In the mechanism, the parts are arranged so that the circle plate 12 may be pivotally adjusted with respect to either of the coordinates *x* and *y*. Thus the axis *x* may be positioned at any angle $\theta$ on the circle plate 12 and any one of the indicators 1, 2 or 3 positioned on the curve X which thus places it radially from the origin a distance equal to hav $\theta$. Since the indicators of each pair are spaced at unity, and it is also a property of the cardioid curve X that the distance from one point on the curve to another taken through the origin O' is always unity, when one indicator 1, 2 or 3 of a pair is placed on the curve X, the other indicator 1*s*, 2*s* or 3*s* also falls on an opposite point of the curve X. By reading the indicator of a pair which shows more precisely the relative position of the pair with respect to the curve, greater accuracy in the setting may be obtained.

Likewise, when the circle plate 12 is rotated to place the axis *y* at an angle $\theta$, either of the indicators 4 and 5 positioned on the curve X places it at a radial distance from the origin equal to hav $\theta$. For instance, for an angle $\theta$ of 60°, cos $\theta$ is .5 and when this value is substituted in the formula $$P_1=\frac{1-\cos\theta}{2}$$

then $P_1=\text{hav } \theta=.25$ as measured along the radial ordinate between the origin O and the curve X at the angle $\theta$ 60° on the outer scale. By way of illustration, the Haversine for 60° is indicated by the point $P_1$ on the curve X in Fig. 3 as having a value of $O'P_1$ or .25, and if the axis *x* is oriented at the angle $\theta=60°$ on the outer scale of circle plate 12, either of the indicators 1, 2 or 3 may be indexed on the curve X, the indicator 1 being shown on the curve X and it will then be at a distance from the origin O on the axis *x* equal to the haversine of angle $\theta$ of 60°.

Similarly the circle plate 12 may be oriented to the axis *y* and either of the indicators 4 or 5 may be placed on the curve X to establish along the axis *y* a value of the haversine of the angle $\theta$ to which the axis *y* is oriented. It is thus seen that the sides OM, OM' and ON, ON' of the triangles OMN, OM'N' in Fig. 5 may be established for various values of haversines of angles $\theta$.

The mechanism will be further understood by a description of the manner of solution of some of the problems.

In problem 1, where the sides *a*, *b* and *c* are given in the spherical triangle A, B and C illustrated in Fig. 1 and it is desired to find angle C, the formula $$\text{hav } C=\frac{\text{hav } c-\text{hav } (a-b)}{\text{hav } (a+b)-\text{hav } (a-b)}$$

is set up on the mechanism as follows:

Throughout the problem the indicator 5 is set and locked by means to be described at a distance from the origin O which equals 1 or unity on a linear scale S. Referring to Figs. 3, 4 and 5, the circle plate 12 is rotated until the axis *x* forms an angle $\theta=a-b$ with the axis Q on the outer scale 13 on the circle plate 12 (counterclockwise from the axis Q). The indicator 1 is then positioned over the point where the curve X intersects the axis *x* and is now at a distance from the origin O equal to hav $(a-b)$. The indicator 1 is locked in position by means to be described on the axis *x*. Then the circle plate 12 is rotated to place the axis at an angle $\theta=a+b$ with the axis Q and the indicator 3 is indexed over the curve X, so that its distance from the origin O now equals hav $(a+b)$ and it is locked in this position.

Then the circle plate is rotated to place axis *x* at the angle *c* and the indicator 2 is then indexed over the curve placing it at a distance from the origin O equal to hav *c*.

Figure 7:
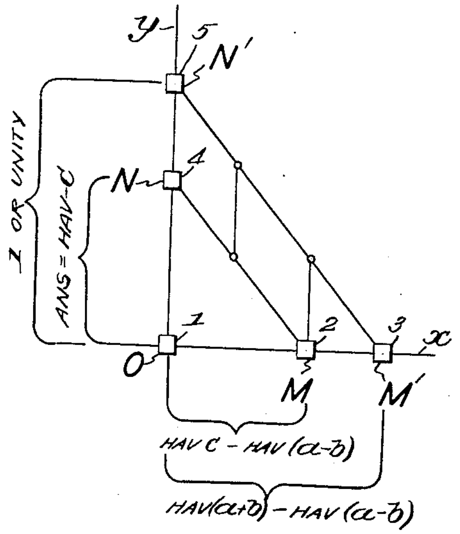

By means to be described, the three indicators 1, 2 and 3 are now locked together and, as shown in Fig. 7, they are moved to the left along the axis *x* until the indicator 1 is positioned over the origin O. It will now be seen, Fig. 7, that the distance of the indicator 2 from the origin O equals hav $c-\text{hav } (a-b)$ forming the side OM of the triangle OMN and that the distance of the indicator 3 from the origin O equals hav $(a+b)-\text{hav } (a-b)$ forming the side OM' of the triangle OM'N'. Reverting to the formula $$\frac{OM}{ON'}=ON$$

where ON' equals unity or 1 and to which the indicator 5 was set at the beginning of the solution, it will now be seen that the distance ON provides the answer to the problem in the form hav C. The angle C is obtained by rotating the circle plate 12 until the curve X coincides with the indicator 4 and reading the corresponding angle on the outer scale of the circle plate 12 at the axis *y*.

The second problem for the spherical triangle, in which it is desired to find side *c* in Fig. 1 when the sides *a* and *b* and the angle C are given, is similarly set up.

Figure 8:
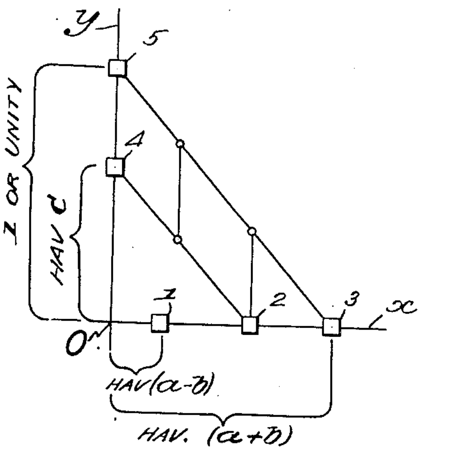
Figure 9:
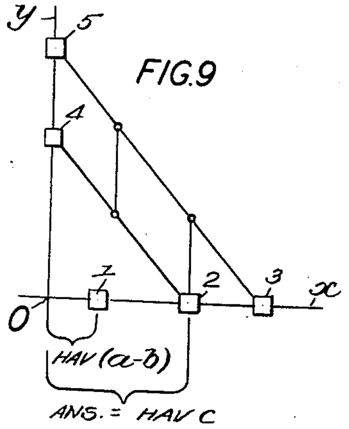

Referring in sequence to Figs. 8, 7 and 9, indicator 5 is locked at unity on the axis *y* throughout the problem. As before, the indicators 1 and 3 are set respectively for values of hav $(a-b)$ and hav $(a+b)$. The indicator 4 is set for value of hav C on the axis *y*. The indicators 1 and 3 are now locked together independently of indicator 2 and together they are moved to the left so that indicator 1 is over the origin O, as shown in Fig. 7. Since the indicators 4 and 5 remain locked during this translation, indicator 2 was also moved toward the origin O a smaller but proportionate distance. The parts are now in the relationship shown in Fig. 7. Indicator 2 is now locked to indicators 1 and 3, indicator 4 is unlocked so as to be movable along the axis *y* and the circle plate 12 is rotated to place the axis *x* at angle $a-b$. Indicators 1, 2 and 3 are moved together to position the indicator 1 over the curve X, thus placing it back at a distance from the origin O which equals the value of the hav $(a-b)$, as seen in Fig. 9. As further seen in Fig. 9, the indicators 3, 4 and 5 are in the same position as in Fig. 5 and the distance between the origin O and the indicator 2 is the answer required in the form of hav $c$. The side $c$ is obtained by rotating the circle plate 12 until the indicator 2 is on the curve X and reading the angle on the outer scale of the circle plate 12 at the axis $x$.

In the solution of the plane oblique triangle A'B'C', Fig. 2, for the side $b'$, given side $a'$ and angle A'; and B', a different set of curves on the circle plate is used for solution by the law of tangents, in which $$\frac{a'-b'}{a'+b'}=\frac{\text{tangent } \frac{1}{2}(A'-B')}{\text{tangent } \frac{1}{2}(A'+B')}$$

or $$\frac{a'}{b'}=\frac{\text{tangent } \frac{1}{2}(A'+B')+\text{tangent } \frac{1}{2}(A'-B')}{\text{tangent } \frac{1}{2}(A'+B')-\text{tangent } \frac{1}{2}(A'-B')}$$

Inscribed on the circle plate 12 is a curve Y given by the formula $$P_2=\tan\frac{\theta}{2}$$

and plotted to the polar coordinate scale 14, the axis of which being reciprocal to the scale 13, avoids superimposing and comprising the X and Y curves. Also inscribed on the circle plate is a curve W given by the formula $P_4=1+P_2$ and a curve Z given by the formula $P_3=1-P_2$, the curves W, Y and Z being used in the solution of the plane oblique triangle.

The proportion for $$\frac{a'}{b'}$$

is set up in the similar triangles on the $y$ axis and the proportion on the right hand side of the formula is set up on the $x$ axis, both as direct values and not as functions.

Since the indicators 1, 2 and 3 are spaced from their respective supplementary indicators 1s, 2s and 3s each at a distance which equals unity or 1 on the scale of the curves on the circle plate 12, it will be seen, for instance, that when indicator 1 is set on curve Z its distance from the origin O equals $$1-\tan\frac{\theta}{2}$$

and that the indicator 1s will be positioned over curve Y at a distance to the left of the origin O which equals $$\tan\frac{\theta}{2}$$

and similarly with the use of indicators 2 and 2s with respect to the curves Z and Y respectively. When the indicator 3s is on the curve Y to the right of the $y$ axis its distance from O is $$\tan\frac{\theta}{2}$$

and the indicator 3 is then on the curve W at a distance from O which is $$1+\tan\frac{\theta}{2}$$

Figure 10:
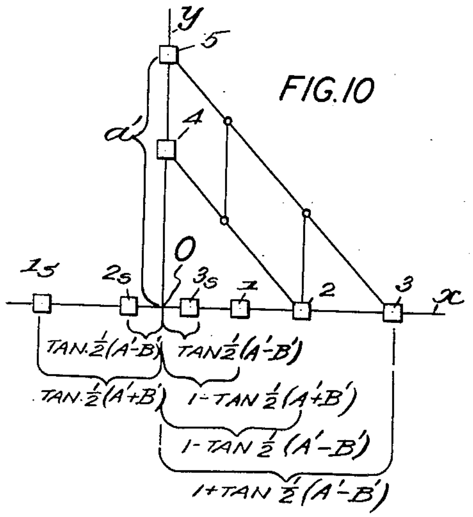
Figure 11:
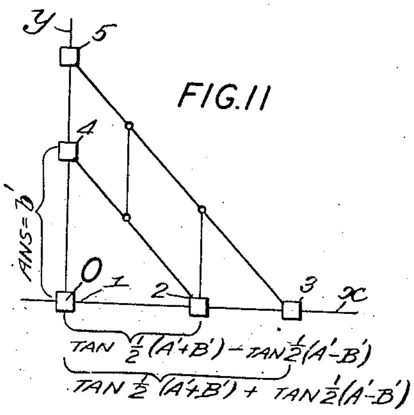

Referring now to Fig. 10, with the indicators all unlocked with respect to each other, indicator 5 is set on the linear scale S and locked at a distance from origin O which is equal to $a'$ in the expression $$\frac{a'}{b'}$$

at the left of the above formula.

The circle plate 12 is rotated until the $x$ axis is positioned over an angle $A'-B'$ on the middle degree scale 14. Then the supplemental indicator 3s is positioned over the curve Y placing it a distance from the origin O equal to tan ½ $(A'-B')$ and indicator 3 will be positioned over curve W a distance from the origin O equal to 1+tan ½ $(A'-B')$.

In the next step the $x$ axis is placed over an angle $A'+B'$ on the inner scale 15 of the circle plate 12. Since the inner scale 15 is reciprocal to the middle scale 14, the curve Y is now on the left side of the axis $y$. The indicator 1s is positioned over the curve Y a distance from the origin O which equals the tangent of ½ $(A'+B')$ and the indicator 1 will then be positioned on curve Z a distance from the origin O which equals 1−tan ½ $(A'+B')$. The indicators 1 and 1s are locked to the indicators 3 and 3s to preserve their relation thereto.

The axis $x$ is then positioned over the angle $A'-B'$ on the inner scale 15 of the circle plate 12. The indicator 2s is positioned over the curve Y a distance from the origin O which equals the tangent of ½ $(A'-B')$ and the indicator 2 will then be positioned on curve Z a distance from the origin O equal to 1−tan ½ $(A'-B')$. The indicators 2 and 2s are locked to the indicators 1 and 3 to preserve their relationship to them.

The indicators 1, 2 and 3 are now moved simultaneously until the indicator 1 is positioned over the origin O, as seen in Fig. 10. The distance of the indicator 2 from the origin O is now equal to $$\tan \tfrac{1}{2}\,(A'+B')-\tan \tfrac{1}{2}\,(A'-B')$$

and the distance of the indicator 3 from the origin O is now equal to tan ½ $(A'+B')$+tan ½ $(A'-B')$. Since these distances satisfy the expressions at the right hand side of the above equations for the demoninator and the enumerator respectively, it becomes apparent that the distance of the indicator 4 from the origin O, because of the similarity of the triangles, satisfies the value of $b'$ which is the denominator in the expression at the left hand side of the above formula, thus providing the solution of the problem.

For ease and accuracy in operating, the machine has axial verniers 21 and 22, Fig. 4, on the $x$ and $y$ axes respectively for use in directly setting and reading an angle on the scale of the circle plate 12 with respect to either of these axes. These are on a circular glass ring 23, see also Fig. 12, which is fixed with respect to the slide plate 6.

Also, for convenience in eliminating the steps of adding and subtracting during use in finding the values of angles which equal the sums and differences of the other angles, such as angles $a+b$ and $a-b$, and the like, in orienting the $x$ axis in the problems described, there are provided a movable sum ring 24 and vernier 25, Figs. 4 and 13, and a movable difference ring 26 and vernier 27, Figs. 4 and 14. The terms sum ring and difference ring are arbitrarily used for convenience, since in some solutions their functions are reversed. In setting up a problem using sums and differences of angles, for instance angles $a+b$ and $a-b$, where $a$ is greater than $b$, the index or zero mark of the sum vernier 25 is set at an angle clockwise from the $x$ axis which equals $b$, and the difference vernier 27 is indexed at an angle counterclockwise from the $x$ axis which also equals $b$. Then, when it is desired to index the circle plate to place the $x$ axis at the angle $a+b$, the value of angle $a$ on the circle plate is indexed at the sum vernier and the $x$ axis is then automatically positioned at the angle $a+b$. When it is desired to index the $x$ axis at the angle $a-b$, the value of angle $a$ on the circle plate is indexed at the difference vernier and the $x$ axis is then positioned at the angle $a-b$. As seen in Figs. 13 and 14, the verniers 25 and 27 are radially inward extensions of their respective rings 24 and 26, upon the top of which the vernier indicia are inscribed and readable through the glass ring 23. The sum and difference vernier rings 24 and 26 have extensions 28 and 29 respectively, upwardly protruding through slots in a cover ring 30, Figs. 13 and 14, for quick manual setting of the verniers. Surrounding each vernier ring 24 and 26 is a clamp ring 31 and 32 respectively, Figs. 13, 14, 15 and 16, each having a pair of upwardly extending clamping members 33 which are brought together by the turning of a screw 34 to secure the clamp ring to its respective vernier ring, Figs. 17 and 18. Each of the clamping rings 31 and 32 also has an upwardly extending slow motion member 36, Figs. 15, 16 and 15*a*, disposed between a screw 37 and a spring urged plunger 38 carried in a pair of bosses 39 and 40 fixed on the cover ring 30. The parts 33 to 40 are identical on both clamping rings 31 and 32. Hence, when a clamp screw 34 is rotated to close a clamping ring 31, 32 on its vernier ring 24, 26, the latter is locked against rapid turning but may be precisely adjusted by rotation of the slow motion screw 37 to index the vernier ring where desired.

The circle plate 12 also has a clamping and slow motion mechanism comprising a circle plate clamping ring 45, Figs. 13, 19, 20, which slidably surrounds a circle plate ring 46, Fig. 13, which in turn is fixed on the periphery of the circle plate 12, and rotates with it. The circle plate clamp ring 45 has a framework 47, see also Fig. 4, protruding outwardly through a slot in the cover ring 30, through which is threaded a clamp screw 48 which engages a sliding block 49 which may be turned up against the circle plate ring 46 to lock the circle plate to its clamp ring 45. As seen in Figs. 20 and 21, the framework 47 has a downwardly extending finger 51 which is held between a slow motion screw 52 and a spring loaded plunger 53 carried in a pair of bosses 54 and 55 fixed to the cover ring or frame of the instrument. It is thus seen that after the circle plate 12 is roughly positioned by the operator's finger applied in a detent 70, Fig. 3, in its top surface, the clamp screw 48 may be turned up to lock the circle plate 12 and a fine adjustment made by turning the slow motion screw 52.

The mechanism for moving the indicators 1, 1*s*, 2, 2*s*, 3, 3*s*, 4, 4*s* and 5 is shown in detail in Figs. 6, 12 and 22. Supporting each pair of indicators is a slide 1*a* for the pair 1 and 1*s*, a slide 2*a* for the pair 2 and 2*s*, a slide 3*a* for the pair 3 and 3*s*, these three slides being supported in an interrupted track or slideway 60, 60*a* coincident with the slideway 7 and axis *x* in the slide plate 6, see Fig. 4; and slides 4*a* and 5*a* for the indicators 4, 4*s* and 5, these being supported in an interrupted slideway 61 and 61*a* coincident with the slideway 8 and axis *y*. On the slide 1*a* is mounted a structure supporting the slides 1 and 1*s* in fixed relation spaced at unity in the slideway 7, comprising a post 1*b*, a pair of arms 1*c* and 1*d*, and a horizontal shaft 1*e* having at one end slidably protruding out of the instrument a push-pull knob 1*f* mounted on a stub shaft 1*g* which is rotatable but axially fixed with respect to the shaft 1*e*. A somewhat similar structure comprising a post 2*b*, a pair of arms 2*c* and 2*d*, a horizontal shaft 2*e*, and a push-pull knob 2*f* on a rotatable stub shaft 2*g* supports the indicators 2 and 2*s* in fixed relation spaced at unity in the slideway 7. A likewise similar structure 3*b*, 3*c*, 3*d*, 3*e* and 3*f* supports the indicators 3 and 3*s* in fixed relation spaced at unity in the slideway 7, but the push-pull knob 3*f* has no stub shaft and is not rotatable with respect to the shaft 3*e*. Fixedly mounted on the shaft 3*e* is a locking plate 16 having holes 17 and 18 through which pass respectively the stub shafts 1*g* and 2*g*. The stub shafts 1*g* and 2*g* are eccentrically mounted with respect to their shafts 1*e* and 2*e* and therefore may be turned to lock them into the lock plate 16. By this means the indicators 1, 1*s* and 2, 2*s* may be locked to the indicators 3, 3*s* and moved slidably together with them along the axis *x*.

The indicator 4 is supported on its slide 4*a* by a post 4*b* to which is secured a push-pull knob 4*f* slidably protruding from the instrument. The indicator 5 is supported on its slide 5*a* by a post 5*b* to which is attached a similar push-pull knob 5*f* protruding from the instrument. The indicators are thus roughly positioned by their respective push-pull knobs.

For fine adjustment of the indicators, each of the slides 1*a*, 2*a*, 3*a*, 4*a* and 5*a* has fixed below it a threaded plate 1*h*, 2*h*, 3*h*, 4*h* and 5*h* respectively. Associated with these plates are fine adjustment screws 1*j*, 2*j*, 4*j* and 5*j* having protruding knurled knobs 1*k*, 2*k*, 4*k* and 5*k* respectively by which they can be turned. The shafts of these screws pass through swivel bearings 1[1], 2[1], 4[1] and 5[1] by which the screws 1*j*, 4*j* and 5*j* can be swivelled into and out of engagement with the respective threaded plates 1*h*, 4*h* and 5*h*, and by which the screw 2*j* can be swivelled selectively into engagement with either of the threaded plates 2*h* or 3*h* for use in making fine adjustments of the indicators with respect to any of the curves W, X, Y or Z being used on the circle plate 12. These micrometer screws also serve as intermediate locks for the plates to which they are engaged, and until the indicators are fastened to the lock plate.

By the use of circle plates containing one or more curves of various angular functions, which may be expressed as polar equations, the computer may also be used for other solutions.

Generally stated, the computer is applicable to the solution of any equation in which the unknown variable equals the product of a constant times a fraction in which the numerator and denominator are sums or differences of pairs of functions of angular variables.

Such equations may have one of the three following forms:

$$(1)\qquad X=f_1(\theta)=a\frac{f_2(A)+f_3(B)}{f_4(\phi)+f_3(B)}$$

$$(2)\qquad X=f_1(\theta)=a\frac{f_2(A)-f_3(B)}{f_4(\phi)-f_3(B)}$$

$$(3)\qquad X=f_1(\theta)=a\frac{-f_2(A)+f_3(B)}{+f_4(\phi)+f_3(B)}$$

in which "*a*" is a constant and $f_1(\theta)$, $f_2(A)$, $f_3(B)$ and $f_4(\phi)$ are functions of $\theta$, A, B, and $\phi$ respectively, expressed as polar equations in which $\theta$, A, B and $\phi$ are the variable angular values respectively.

I claim:

1. A mechanical computer for solving equations containing functions of angular variables comprising at least two indicators movably arranged along each of two rectangular coordinates, parallelogram means connecting said indicators whereby with the origin of said coordinates they form similar triangles in any position of said indicators along their respective coordinates, a circle plate forming polar coordinates having an origin coinciding with the origin of said rectangular coordinates, said circle plate being rotatable relative to said rectangular coordinates and having inscribed thereon, with reference to a polar axis, a curve of angular functions contained in an equation whose solution is desired, the indicators being capable of radial positioning for linear values and with respect to the curve for functional values corresponding to angular values on the circle plate to which the respective rectangular coordinates are oriented by rotation of the circle plate, thereby to form proportional values between said indicators and the origin containing a desired solution.

2. In the computer as set forth in claim 1 and in combination, means to lock at least one of the indicators in an adjusted position with respect to the origin.

3. In the computer as set forth in claim 1 and in combination, means to lock together the indicators which are on at least one of the rectangular coordinates and to move them along said coordinate while preserving their relative position with respect to each other.

4. In the computer as set forth in claim 1 and in combination, means to lock together and with respect to the origin, the indicators on at least one of the rectangular coordinates.

5. In the computer as set forth in claim 1 and in combination, means to lock a first indicator on its coordinate with respect to the origin, means to lock together the indicators which are on the other coordinate and to move them together with respect to the origin, while the said first indicator remains fixed relative to the origin.

6. A mechanical computer for solving equations containing functions of angular variables comprising means forming a pair of rectangular coordinates having an origin, indicators slidable along the coordinates, means connecting said indicators whereby they form with the origin, similar right triangles having parallel sides in any position of the indicators, and a relatively rotatable member forming polar coordinates having an origin coincident with the origin of said rectangular coordinates, said rotatable member having a curve of radial values of functions of corresponding angles around the polar origin, each of said indicators being capable of radial positioning variously for linear values and with respect to the curve for functional values of corresponding angles thereby to form proportional values between said indicators and the origin containing a desired solution.

7. In a mechanical computer, means forming a pair of rectangular coordinates having an origin, a first and a second indicator movable along one of the coordinates and a third and a fourth indicator movable along the other of said coordinates, operating means connecting all four said indicators and controlling their relative movable relationships along their respective said coordinates whereby in any adjusted positions of three of said indicators for known values along their respective said coordinates the four said indicators form with the origin, similar right triangles and the position of the fourth said indicator provides an unknown value on its respective coordinate.

8. In the computer as set forth in claim 7 and in combination, means to lock each of the indicators in an adjusted position along its respective coordinate.

9. In the computer as set forth in claim 7 and in combination, means to lock together the indicators on a coordinate at a predetermined interval and to move said indicators along the coordinate while preserving said interval.

10. In the computer as set forth in claim 7 and in combination, a third indicator movably arranged on one of the coordinates between the origin and one of the other indicators, means to lock said third indicator to said other indicator and then to move them together along the coordinate until the third indicator is positioned over the origin thereby positioning said other indicator from the origin at a distance which is the difference between the original distances between the origin and each of the said indicators.

11. In the computer as set forth in claim 7 and in combination, a third indicator movably arranged on one of the coordinates opposite the origin from one of the other indicators on said coordinate, means to lock said third indicator to said other indicator and then to move them together along the coordinate until the third indicator is positioned over the origin thereby positioning said other indicator from the origin at a distance which is the sum of the original distances between the origin and each of the said indicators.

12. A mechanical computer comprising two indicators independently movable along each of a pair of rectangular coordinates, mechanism connecting and maintaining said indicators in proportional relationships between each other and the origin of said coordinates, a third indicator on one of said coordinates independently movable relative to the other two, means selectively to lock said three indicators at predetermined distances apart and to move them along the coordinate together, and a circle plate member relatively rotatable around said origin relative to said coordinates having a curve of angular functions on polar coordinates having said origin, said indicators being selectively adjustable relative to the curve to record proportional relationships between functions of angles to which the indicators are oriented.

13. In the computer as set forth in claim 12 and in combination, each of the three indicators on said one coordinate having a supplemental indicator fixed to and moveable with it along the coordinate at a distance of unity, said circle plate member having a second curve for cooperation with said supplemental indicators and whose radial values differ from the values of said curve of angular functions by a difference of unity, for supplements of angles corresponding to said curve of angular functions.

14. In the computer as set forth in claim 12 and in combination, slow motion mechanisms for selectively adjusting said indicators with respect to said curve.

15. In the computer as set forth in claim 12 and in combination, at least one vernier for accurately orienting said circle plate member relative to said coordinates.

16. In the computer as set forth in claim 12, locking means and slow motion mechanism for accurately adjusting said circle plate member relative to said coordinates.

17. In the computer as set forth in claim 12, an angular difference index member angularly adjustable with respect to one of the coordinates for direct observation of an angle which equals the difference between two other angles.

18. In the computer as set forth in claim 12, an angular sum index member angularly adjustable with respect to one of the coordinates for direct observation of an angle which equals the sum of two other angles.

19. A mechanical computer for solution of the spherical triangle by the haversine formula comprising two indicators independently movable along each of a pair of rectangular coordinates, mechanism connecting and maintaining said indicators in proportional relationships between each other and the origin of said coordinates, a third indicator on one of said coordinates independently movable relative to the other two, means selectively to lock said three indicators at predetermined distances apart and to move them along the coordinate together, and a circle plate member relatively rotatable around said origin relative to said coordinates having a cardioid curve of haversine or polar coordinates having said origin, one of said indicators being adjustable to a value of unity, two of the other said indicators being selectively adjustable relative to the curve to record the proportional relationships between known values in the haversine formula and another indicator automatically recording the unknown value in the haversine formula, readable as an angle when oriented to the curve.

References Cited in the file of this patent

UNITED STATES PATENTS

| | | |
|---|---|---|
| 2,210,939 | Garrett | Aug. 13, 1940 |
| 2,421,965 | Pereira | June 10, 1947 |
| 2,534,601 | Jensen | Dec. 19, 1950 |
| 2,571,038 | Hognerg | Oct. 9, 1951 |
| 2,576,149 | Sharp | Nov. 27, 1951 |

FOREIGN PATENTS

| | | |
|---|---|---|
| 7,647 | Great Britain | of 1895 |